United States Patent
Jeong et al.

(10) Patent No.: US 11,689,825 B2
(45) Date of Patent: *Jun. 27, 2023

(54) METHOD, APPARATUS, AND RECORDING MEDIUM FOR PROCESSING IMAGE

(71) Applicant: SAMSUNG ELECTRONICS CO., LTD., Suwon-si (KR)

(72) Inventors: Jae-yun Jeong, Suwon-si (KR); Byeong-doo Choi, Suwon-si (KR); Jae-kyeong Lee, Yongin-si (KR); Eric Yip, Seoul (KR); Jae-eun Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/320,855

(22) Filed: May 14, 2021

(65) Prior Publication Data

US 2021/0274113 A1    Sep. 2, 2021

Related U.S. Application Data

(63) Continuation of application No. 15/782,159, filed on Oct. 12, 2017, now Pat. No. 11,025,845.

(Continued)

(30) Foreign Application Priority Data

May 31, 2017  (KR) .................. 10-2017-0067633

(51) Int. Cl.
*G06T 5/00*        (2006.01)
*H04N 25/61*    (2023.01)
(Continued)

(52) U.S. Cl.
CPC ............. *H04N 25/61* (2023.01); *G06T 5/006* (2013.01); *H04N 23/698* (2023.01); *G02B 13/06* (2013.01); *G06T 2207/10024* (2013.01)

(58) Field of Classification Search
CPC .... H04N 5/3572; H04N 1/00; H04N 5/23238; G02B 13/06; G06T 5/006; G06T 2207/10024
See application file for complete search history.

(56) References Cited

U.S. PATENT DOCUMENTS

| | | | |
|---|---|---|---|
| 7,453,502 B2 * | 11/2008 | Schweng | G06T 5/008 348/241 |
| 7,548,262 B2 * | 6/2009 | Nikkanen | H04N 9/04557 348/241 |

(Continued)

FOREIGN PATENT DOCUMENTS

| | | |
|---|---|---|
| JP | 2014-71860 A | 4/2014 |
| KR | 10-2007-0113035 A | 11/2007 |
| KR | 10-2013-0002701 A | 1/2013 |

OTHER PUBLICATIONS

Byeongdoo Choi et al., "Text of ISO/IEC 23000-20 CD Omnidirectional Media Application Format", International Organisation For Standardisation Organisation Internationale De Normalisation ISO/IEC JTC1/SC29/WG11 Coding Of Moving Pictures And Audio, ISO/IEC JTC1/SC29/WG11 N16636 Jan. 2017, Geneva, Switzerland, (48 Pages Total).

(Continued)

*Primary Examiner* — Sean T Motsinger
(74) *Attorney, Agent, or Firm* — Sughrue Mion, PLLC

(57) ABSTRACT

A method, performed by a device, of processing an image, may include obtaining a circular image generated by photographing a target space through a fisheye lens; generating metadata including lens shading compensation information for correcting color information of the obtained circular (Continued)

image; and transmitting the obtained circular image and the metadata to a terminal.

8 Claims, 15 Drawing Sheets

Related U.S. Application Data

(60) Provisional application No. 62/407,090, filed on Oct. 12, 2016.

(51) Int. Cl.
*H04N 23/698* (2023.01)
*G02B 13/06* (2006.01)

(56) References Cited

U.S. PATENT DOCUMENTS

| | | | |
|---|---|---|---|
| 8,059,169 B2 | 11/2011 | Noh | |
| 8,804,013 B2 | 8/2014 | Park et al. | |
| 8,823,841 B2* | 9/2014 | Liu | H04N 9/04517 348/241 |
| 9,001,238 B1* | 4/2015 | Chen | H04N 5/3572 348/251 |
| 9,392,180 B2* | 7/2016 | Hsu | H04N 5/3572 |
| 9,509,908 B2 | 11/2016 | Saito et al. | |
| 9,681,026 B2* | 6/2017 | Feng | G06T 5/006 |
| 11,025,845 B2* | 6/2021 | Jeong | H04N 5/23238 |
| 2002/0135688 A1 | 9/2002 | Niikawa | |
| 2004/0247195 A1* | 12/2004 | Chauville | H04N 1/58 382/254 |
| 2005/0002586 A1* | 1/2005 | Liege | H04N 1/00071 382/254 |
| 2005/0270402 A1* | 12/2005 | Nikkanen | H04N 9/04557 348/E9.005 |
| 2007/0211154 A1* | 9/2007 | Mahmoud | H04N 5/3572 348/E5.079 |
| 2008/0291302 A1 | 11/2008 | Noh | |
| 2009/0060369 A1* | 3/2009 | Agarwala | G06T 5/005 382/261 |
| 2009/0268053 A1* | 10/2009 | Wang | H04N 5/3572 348/229.1 |
| 2010/0165144 A1* | 7/2010 | Lee | H04N 5/2354 348/229.1 |
| 2010/0303297 A1* | 12/2010 | Mikhailov | G06T 7/11 382/103 |
| 2011/0001854 A1 | 1/2011 | Nguyen | |
| 2011/0298933 A1* | 12/2011 | Yanowitz | H04N 9/04557 348/E17.002 |
| 2011/0298944 A1* | 12/2011 | Kuo | H04N 9/04557 382/167 |
| 2013/0002912 A1* | 1/2013 | Park | H04N 5/3572 348/251 |
| 2013/0258044 A1* | 10/2013 | Betts-Lacroix | H04N 13/243 348/E5.09 |
| 2013/0258135 A1* | 10/2013 | Hsu | H04N 5/3572 348/E5.037 |
| 2014/0092207 A1* | 4/2014 | Saito | H04N 5/23238 348/36 |
| 2014/0300753 A1* | 10/2014 | Yin | G01J 3/524 348/187 |
| 2015/0281507 A1* | 10/2015 | Konen | H04N 5/217 348/231.6 |
| 2015/0312560 A1* | 10/2015 | Deering | G02B 27/0172 345/1.3 |
| 2016/0028975 A1* | 1/2016 | Lee | H04N 19/463 348/251 |
| 2017/0243373 A1* | 8/2017 | Bevensee | G06T 7/557 |
| 2017/0316600 A1* | 11/2017 | Jeong | H04N 21/84 |
| 2018/0025478 A1* | 1/2018 | Lee | H04N 5/23238 382/284 |
| 2018/0070070 A1* | 3/2018 | Ho | H04N 13/111 |
| 2018/0075635 A1* | 3/2018 | Choi | H04N 13/156 |
| 2018/0103219 A1* | 4/2018 | Jeong | H04N 5/217 |
| 2018/0343472 A1* | 11/2018 | Wang | H04N 19/70 |
| 2019/0014350 A1* | 1/2019 | Wang | H04N 21/85406 |

OTHER PUBLICATIONS

Byeongdoo Choi et al., Text of ISO/IEC 23000-20 CD Omnidirectional Media Application Format, International Organisation for Standardisation Organisation Internationale De Normalisation ISO/IEC JTC1/SC29/WG11 Coding of Moving Pictures and Audio, ISO/IEC JTC/SC 29,Date: Jan. 13, 2014, ISO/IEC FDIS 14496-15:2014(E), ISO/IEC JTC 1/SC 29/WG 11, Secretariat: Information technology—Multimedia application format (MPEG-A)—Part 20: Omnidirectional media application format, (49 Pages Total).

Communication dated Apr. 23, 2018, issued by the Korean Patent Office in counterpart Korean Application No. 10-2017-67633.

Communication dated Aug. 1, 2019, from the European Patent Office in counterpart European Application No. 17860412.0.

Communication dated Aug. 3, 2020, issued by the Korean Intellectual Property Office in corresponding Korean Application No. 10-2019-0021293.

International Search Report (PCT/ISA/210) dated Jan. 24, 2018 issued by the International Searching Authority in counterpart International Application No. PCT/KR2017/011231.

Written Opinion (PCT/ISA/237) dated Jan. 24, 2018 issued by the International Searching Authority in counterpart International Application No. PCT/KR2017/011231.

Communication issued by the European Patent Office dated Mar. 20, 2023 in European Patent Application No. 17860412.0.

\* cited by examiner

FIG. 6

```
unsigned int(16) num_polynomial_coefficeients_lsc; (610)
    for(j=0; j< num_polynomial_coefficients_lsc; j++) {
    unsigned int(32) polynomial_coefficient_K_lsc_R; (620)
    unsigned int(32) polynomial_coefficient_K_lsc_G; (630)
    unsigned int(32) polynomial_coefficient_K_lsc_B; (640)
}
```
— 600

METHOD, APPARATUS, AND RECORDING MEDIUM FOR PROCESSING IMAGE

CROSS-REFERENCE TO RELATED APPLICATIONS

This application is a Continuation Application of U.S. application Ser. No. 15/782,159, filed on Oct. 12, 2017, which claims priority from U.S. Provisional Application No. 62/407,090, filed on Oct. 12, 2016, in the U.S. Patent and Trademark Office, and Korean Patent Application No. 10-2017-0067633, filed on May 31, 2017, in the Korean Intellectual Property Office, the disclosures of which are incorporated herein in their entireties by reference.

BACKGROUND

1. Field

Apparatuses and methods consistent with exemplary embodiments relate to processing an image, and a recording medium having recorded thereon a program for executing the method of processing an image.

2. Description of the Related Art

Virtual reality (VR) indicates an interface between a user and a device, which involves rendering, by a computer, a specific environment or situation and enabling the user to interact as if the user is in a real environment or situation. A device, which is capable of providing VR to a user, provides a user interface through which the user may experience a situation or environment that she otherwise could not have experienced, and allows the user to manipulate the situation or environment.

With an increased interest in VR, techniques for implementing VR have also significantly improved. In particular, research into techniques for processing images including a virtual space needed for implementing VR has been carried out. For example, owing to developments in VR image related techniques, users may view 360-degree images instead of planar images.

SUMMARY

One or more example embodiments provide an image processing method, an apparatus, and a recording medium capable of rendering a virtual reality (VR) image based on a circular image in a terminal by providing a terminal with metadata and the circular image for correcting the circular image captured through a fisheye lens.

Additional aspects will be set forth in part in the description which follows and, in part, will be apparent from the description, or may be learned by practice of the presented example embodiments.

According to an aspect of an example embodiment, there is provided a method, performed by a device, of processing an image. The method may include obtaining a circular image generated by photographing a target space through a fisheye lens; generating metadata including lens shading compensation information for correcting color information of the obtained circular image; and transmitting the obtained circular image and the metadata to a terminal.

The lens shading compensation information may include a parameter indicating correspondence between a plurality of regions in the circular image, each of the plurality of regions being identified by a distance from a center of the circular image, and lens shading compensation values for the plurality of regions.

The lens shading compensation information may include a parameter indicating correspondence between a plurality of regions in the circular image, each of the plurality of regions being identified according to a field of view of the circular image, and lens shading compensation values for the plurality of regions.

The lens shading compensation information may include information about correspondence between a plurality of regions in the circular image and lens shading compensation values for each color of the plurality of regions.

According to an aspect of an example embodiment, there is provided a method, performed by a terminal, of processing an image. The method may include receiving metadata including a plurality of circular images generated by photographing a target space through at least one fisheye lens, and lens shading compensation information associated with the plurality of circular images; generating a plurality of corrected circular images by correcting color information of each of the plurality of circular images based on the lens shading compensation information obtained from the metadata; rendering the plurality of corrected circular images to generate a virtual reality (VR) image for the target space; and outputting the generated VR image.

The correcting the color information may include: determining lens shading compensation values for a plurality of regions in the circular image based on the lens shading compensation information that includes a parameter indicating correspondence between the plurality of regions, identified by a distance from a center of the circular image, and the lens shading compensation values for the plurality of regions; and correcting the color information of the each of the plurality of regions based on the determined lens shading compensation values for the plurality of regions.

The correcting the color information may include: determining lens shading compensation values for a plurality of regions in the circular image based on the lens shading compensation information that includes a parameter indicating correspondence between the plurality of regions, identified according to a field of view of the circular image, and the lens shading compensation values for the plurality of regions; and correcting the color information of the each of the plurality of regions based on the determined lens shading compensation values for the plurality of regions.

The correcting the color information may include: determining lens shading compensation values for a plurality of regions in the circular image based on the lens shading compensation information that includes a parameter indicating correspondence between the plurality of regions and the lens shading compensation values for each color of the plurality of regions; and correcting the color information of the each of the plurality of regions based on the determined lens shading compensation values for the plurality of regions.

According to an aspect of an example embodiment, there is provided a method, performed by a device, of processing an image. The method may include obtaining a circular image generated by photographing a target space through a fisheye lens; determining information about correspondence between a plurality of regions in the obtained circular image and lens shading compensation values for correcting color information of each of the plurality of regions; and transmitting, to a terminal, metadata including (i) information about the correspondence between the plurality of regions and the lens shading compensation values, and (ii) the circular image.

The information about the correspondence may include a coefficient of a polynomial function indicating a correspondence between input data indicating each of the plurality of regions and output data indicating a lens shading compensation value of each of the plurality of regions.

The plurality of regions may be identified according to a distance from a center of the circular image.

The plurality of regions may be identified according to a field of view of the circular image.

The lens shading compensation values may include compensation values for different colors of the plurality of regions.

According to an aspect of an example embodiment, there is provided a method, performed by a terminal, of processing an image. The method may include receiving metadata including a plurality of circular images generated by photographing a target space through at least one fisheye lens, and information about correspondence between a plurality of regions included in each of the plurality of circular images and lens shading compensation values for the plurality of regions; determining a lens shading compensation value for the each of the plurality of circular images based on the received metadata; determining color information of a region of the each of the plurality of circular images based on the determined lens shading compensation value; and rendering the plurality of circular images to generate a virtual reality (VR) image for the target space based on the lens shading compensation value and the color information.

The information about the correspondence may include a coefficient of a polynomial function indicating correspondence between input data indicating each of the plurality of regions and output data indicating the lens shading compensation value of the each of the plurality of regions.

The plurality of regions may be identified according to a distance from a center of the circular image.

The plurality of regions may be identified according to a field of view of the circular image.

The lens shading compensation values may include compensation values for different colors of the plurality of regions.

According to an aspect of an example embodiment, there is provided a method, performed by a device, of processing an image. The method may include obtaining a circular image generated by photographing a target space through a fisheye lens; generating metadata including lens shading compensation information for correcting color information of the obtained circular image; generating a gamma corrected circular image by performing gamma correction on the obtained circular image; and transmitting the gamma corrected circular image and the metadata to a terminal.

The metadata may include a parameter relating to a gamma curve applied for the gamma correction.

According to an aspect of an example embodiment, there is provided a method, performed by a terminal, of processing an image. The method may include receiving, from a device, metadata including lens shading compensation information of a plurality of circular images generated by photographing a target space through at least one fisheye lens, and a plurality of first gamma correction images generated by performing first gamma correction on the plurality of circular images; performing degamma correction on the plurality of first gamma correction images; correcting color information of each of the plurality of first gamma correction images subjected to the degamma correction, based on the lens shading compensation information obtained from the metadata; obtaining a plurality of second gamma correction images by performing second gamma correction on the each of the plurality of first gamma correction images whose color information is corrected; and rendering the plurality of second gamma correction images to generate a virtual reality (VR) image for the target space.

The method may further include: analyzing the color information of the plurality of first gamma correction images to obtain a parameter related to a gamma curve applied for the first gamma correction. The degamma correction may be performed based on the obtained parameter related to the gamma curve.

The degamma correction may be performed based on a parameter related to a gamma curve included in the metadata.

According to an aspect of an example embodiment, there is provided a device for processing an image. The device may include a photographing unit configured to obtain a circular image generated by photographing a target space through a fisheye lens; a processor configured to generate metadata including lens shading compensation information for correcting color information of the obtained circular image; and a communicator configured to transmit the obtained circular image and the metadata to a terminal.

According to an aspect of an example embodiment, there is provided a terminal for processing an image. The terminal may include a communicator configured to receive metadata including a plurality of circular images generated by photographing a target space through at least one fisheye lens, and lens shading compensation information associated with the plurality of circular images; a processor configured to generate a plurality of corrected circular images by color information of each of the plurality of circular images based on the lens shading compensation information obtained from the metadata and render the plurality of corrected circular images to generate a virtual reality (VR) image for the target space; and an outputter configured to output the generated VR image.

The processor may be further configured to determine lens shading compensation values for a plurality of regions in the circular image based on the lens shading compensation information that includes a parameter indicating correspondence between the plurality of regions and the lens shading compensation values for each color of the plurality of regions; and correct the color information of the each of the plurality of regions based on the determined lens shading compensation values for the plurality of regions.

According to an aspect of an example embodiment, there is provided a terminal for processing an image. The terminal may include a communicator configured to receive metadata including a plurality of circular images generated by photographing a target space through at least one fisheye lens, and information about correspondence between a plurality of regions included in each of the plurality of circular images and lens shading compensation values for the plurality of regions; and a processor configured to determine a lens shading compensation value for the each of the plurality of circular images based on the received metadata, determine color information of a region of the each of the plurality of circular images based on the determined lens shading compensation value; and render the plurality of circular images to generate a VR image for the target space based on the lens shading compensation value and the color information.

According to an aspect of an example embodiment, there is provided a device for processing an image. The device may include a photographing unit configured to obtain a circular image generated by photographing a target space through a fisheye lens; a gamma corrector configured to generate metadata including lens shading compensation information for correcting color information of the obtained circular image, and generate a gamma corrected circular image by performing gamma correction on the obtained circular image; and a communicator configured to transmit the gamma corrected circular image and the metadata to a terminal.

According to an aspect of an example embodiment, there is provided a terminal for processing an image. The terminal may include a communicator configured to receive, from a device, metadata including lens shading compensation information of a plurality of circular images generated by photographing a target space through at least one fisheye lens, and a plurality of first gamma correction images generated by performing first gamma correction on the plurality of circular images; and a processor configured to perform degamma correction on the plurality of first gamma correction images, correct color information of each of the plurality of first gamma correction images subjected to the degamma correction based on the lens shading compensation information obtained from the metadata, obtain a plurality of second gamma correction images by performing second gamma correction on the each of the plurality of first gamma correction images whose color information is corrected, and render a plurality of second gamma correction images to generate a VR image for the target space.

BRIEF DESCRIPTION OF THE DRAWINGS

These and/or other aspects will become apparent and more readily appreciated from the following description of the embodiments, taken in conjunction with the accompanying drawings in which:

FIG. 6 illustrates lens shading compensation information, according to an example embodiment;

DETAILED DESCRIPTION

Figure 1:
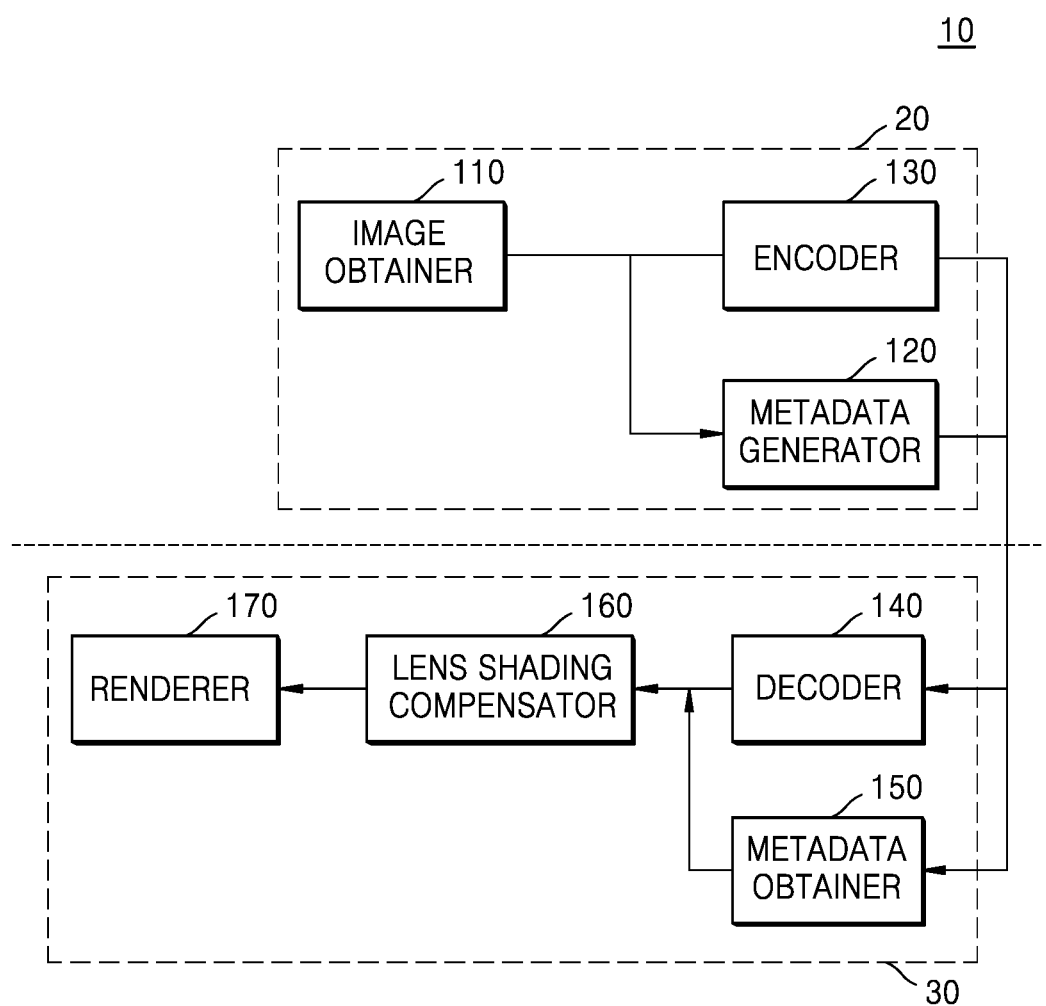
FIG. 1 is a conceptual view for describing a system for processing an image, according to an example embodiment.

Reference will now be made in detail to example embodiments, which are illustrated in the accompanying drawings, wherein like reference numerals refer to like elements throughout. In this regard, the present example embodiments may have different forms and should not be construed as being limited to the descriptions set forth herein. Accordingly, the example embodiments are merely described below, by referring to the figures, to explain aspects. As used herein, the term "and/or" includes any and all combinations of at least one of the associated listed items. Expressions such as "at least one of," when preceding a list of elements, modify the entire list of elements and do not modify the individual elements of the list.

Terms used herein will be described in brief, and the present disclosure will be described in detail.

Although terms used in the present disclosure are selected according to general terms popularly used at present under the consideration of functions in the present disclosure, the terms may vary according to the intention of those of ordinary skill in the art, judicial precedents, or introduction of new technology. In addition, in a specific case, the applicant voluntarily may select terms, and in this case, the meaning of the terms is disclosed in a corresponding description part of the disclosure. Thus, the terms used in the present disclosure should be defined not by the simple names of the terms but by the meaning of the terms and the contents throughout the present disclosure.

Throughout the entirety of the specification of the present disclosure, if it is assumed that a certain part includes a certain component, the term 'including' means that a corresponding component may further include other components unless a specific meaning opposed to the corresponding component is written. Terms used in the embodiments, such as "unit" or "module", indicate a unit for processing at least one function or operation, and may be implemented in hardware, software, or in a combination of hardware and software.

Hereinafter, example embodiments of the present disclosure will be described in detail with reference to the attached drawings to allow those of ordinary skill in the art to easily carry out the embodiments. However, the present disclosure may be implemented in various forms, and are not limited to the example embodiments described herein. To clearly describe the present disclosure, parts that are not associated with the description have been omitted from the drawings, and throughout the specification, identical reference numerals refer to identical parts.

FIG. 1 is a conceptual view for describing a system 10 for processing an image, according to an example embodiment.

The system 10 for processing the image according to example embodiment may include a device 20 and a terminal 30. In addition, the device 20 may include an image obtainer 110, a metadata generator 120, and an encoder 130. The terminal 30 may include a decoder 140, a metadata obtainer 150, a lens shading compensator 160, and a renderer 170. Each of the device 20 and the terminal 30 may be any electronic device capable of processing digital images. For example, the device 20 or the terminal 30 may be a personal computer, a mobile device, a smartphone, a tablet computer, a digital camera, a wearable computing device, and/or a head-mounted display (HMD). In particular, the device 20 may be a server, a photographing device, etc., and the terminal 30 may be a personal computer, a mobile device, a wearable device, an HMD, etc.

However, this is only an example, and components of the system 10 for processing the image, the device 20, and the terminal 30 are not limited to the above-described examples. Meanwhile, the above-described components may be implemented by a software module (e.g., a program module including an instruction), a hardware module (e.g., circuits), or a combination of both. At least one processor may perform a series of operations to be described later according to an instruction of the software module.

The image obtainer 10 may obtain a circular image.

The image obtainer 10 according to an example embodiment may obtain the circular image generated as a result of photographing a target space through a fisheye lens. Here, the target space may be a space to be implemented as a virtual reality (VR) image as a place of a specific environment or a place where a specific situation is depicted. Also, at least one image may be a real image or a computer-generated image. However, this is only an example, and the at least one image may be a combination of real and computer-generated images.

On the other hand, objects constituting the target space may include at least one of a region constituting the target space and a thing and a person existing in the target space. For example, when the target space is an exhibition hall, a wall of the exhibition hall and at least one exhibit present in the exhibition hall may be included in the objects constituting the exhibition hall. According to another example, when the target space is an arena, an image of facilities and people in the arena may be included in objects constituting the arena.

The metadata generator 120 may generate lens shading compensation information of the circular image. Lens shading, also known as vignetting, is a phenomenon in which a color of a periphery of an image is darkened when photographed relative to other areas due to bending of the fisheye lens, which may cause a pattern on the image. The lens shading compensation information may include a gain applied to color information constituting the circular image in order to compensate for occurrence of a pattern on a screen due to the bending of the fisheye lens upon obtaining the circular image.

The encoder 130 according to an example embodiment may encode the obtained circular image. The encoder 130 may perform operations for encoding the circular image. For example, the encoder 130 may perform operations such as intra prediction, inter prediction, and quantization.

Meanwhile, metadata including the encoded circular image and the lens shading compensation information may be transmitted from the device 20 to the terminal 30.

The decoder 140 according to an example embodiment may decode the encoded circular image. The decoder 140 may perform operations for decoding the circular image. For example, the decoder 140 may perform operations such as intra prediction, inter prediction, and inverse quantization.

The metadata obtainer 150 according to an example embodiment may obtain information necessary for operations such as correction and rendering of the circular image from the metadata of the circular image. For example, the metadata obtainer 150 may obtain the lens shading compensation information of the circular image.

The lens shading compensator 160 according to an example embodiment may perform lens shading compensation (i.e., lens shading correction) on the circular image obtained from the decoder 140. For example, the lens shading compensator 160 may correct the color information of the circular image based on the lens shading compensation information. The lens shading compensation information may include a lens shading compensation value such as a red green blue (RGB) gain for each region of the circular image.

The renderer 170 may perform rendering based on the corrected circular image. The renderer 170 may obtain a VR image for the target space through rendering.

The system 10 for processing the image may provide the lens shading compensation information to the terminal 30 even when the device 20 may have a limited capability for performing lens shading compensation or correction on the obtained circular image, and thus lens shading compensation for the circular image may be performed by the terminal 30.

Figure 2:
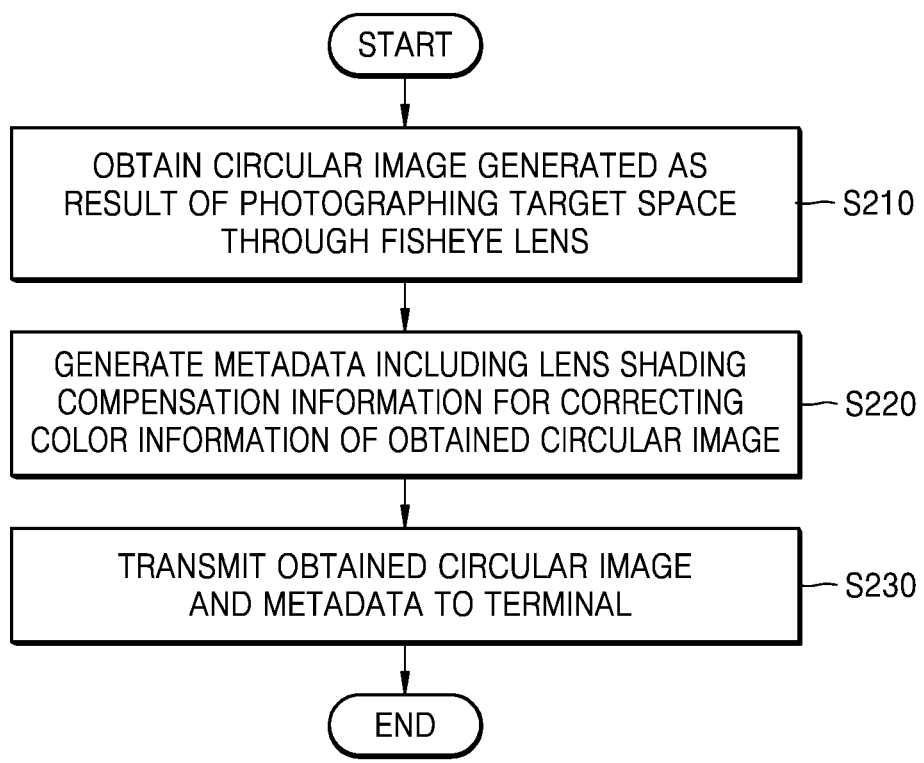
FIG. 2 is a flowchart of a method, performed by a device, of processing an image, according to an example embodiment.

FIG. 2 is a flowchart of a method, performed by a device, of processing an image, according to an example embodiment.

In operation S210, the device may obtain a circular image generated as a result of photographing a target space through a fisheye lens.

The device may obtain a plurality of circular images using a photographing apparatus such as a camera provided in the device. Here, a circular image represents an image photographed through a fisheye lens. For example, the circular image may correspond to a 180-degree field of view of a fisheye lens. Alternatively, the device may receive a plurality of circular images photographed from another external device.

Meanwhile, in the present embodiment, a single circular image has been described as an example for convenience of explanation, but the device may obtain a plurality of circular images so that a VR image for the target space may be rendered.

In operation S220, the device may generate metadata including lens shading compensation information for correcting color information of the obtained circular image.

The device may determine a lens shading compensation value indicating a gain to be applied to an RGB value of the circular image, in order to correct a pattern generated in the circular image due to bending of the fisheye lens.

For example, the lens shading compensation information may include a parameter indicating a correspondence between a plurality of regions in the circular image identified by a distance from a center of the circular image and lens shading compensation values for the plurality of regions. Here, the parameter may be a coefficient of a polynomial function. According to another example, the lens shading compensation information may include a parameter indicating correspondence between a plurality of regions in the circular image identified according to a field of view of the circular image and lens shading compensation values for the plurality of regions. According to another example, the lens shading compensation information may include the lens shading compensation values for the plurality of regions in the circular image.

On the other hand, in addition to the lens shading compensation information, the device may generate metadata including information about at least one of lens distortion correction information, a camera parameter (e.g., Exif data) associated with the circular image, viewing angle information of the circular image, a three-dimensional mesh model to which the circular image is mapped, and gamma correction information. However, this is an example only, and the information included in the metadata is not limited to the above example.

In operation S230, the device may transmit the obtained circular image and the metadata to a terminal.

The device may transmit the circular image and the metadata to the terminal separately and independently from each other. However, this is an example only, and according to another embodiment, the device may encapsulate the circular image and the metadata into one file and transmit the encapsulated circular image and metadata to the terminal.

Further, the device may perform an additional process on the circular image, such as encoding, before transmitting the obtained circular image to the terminal. Accordingly, the device may transmit the encoded circular image and metadata to the terminal.

On the other hand, the lens shading compensation information included in the metadata may be determined by performance of the device or the camera that photographed the circular image. When the lens shading compensation information is provided from the device to the terminal, the lens shading compensation information need not be redundantly provided when the circular image is transmitted later.

Figure 3:
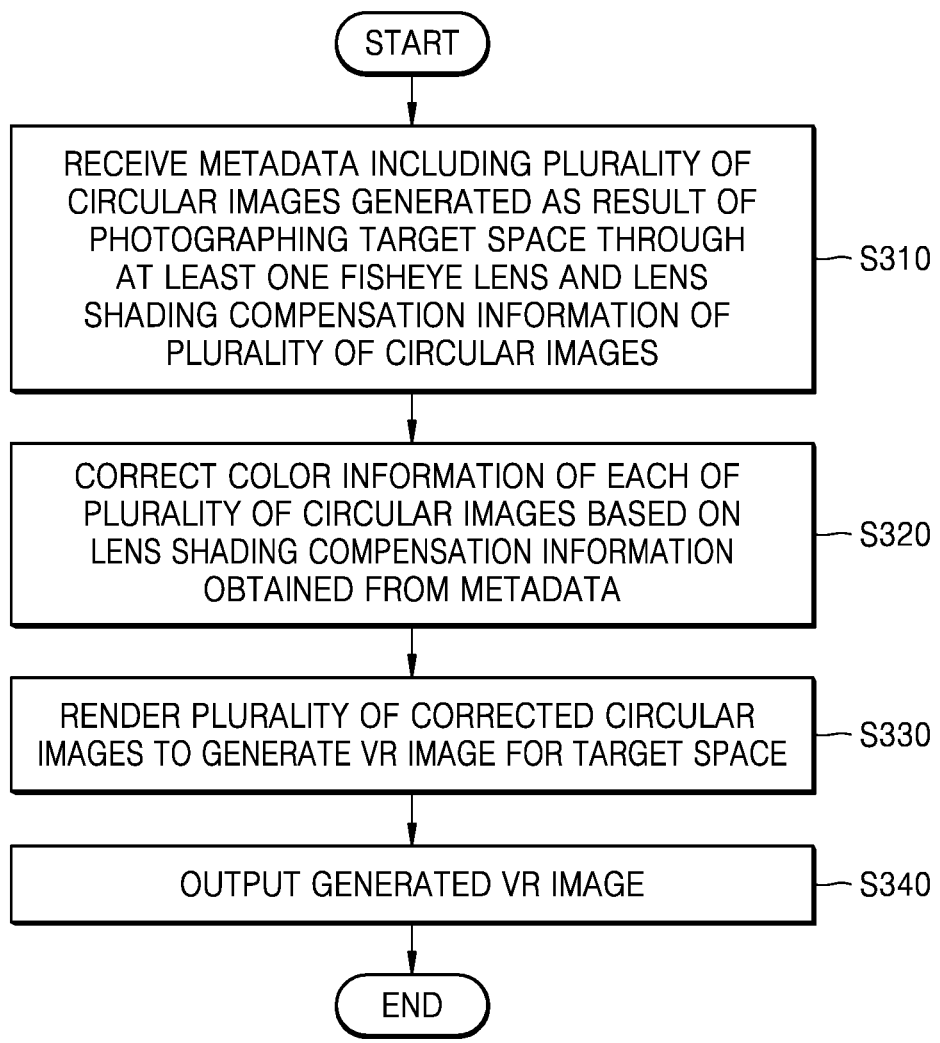
FIG. 3 is a flowchart of a method, performed by a terminal, of processing an image, according to an example embodiment.

FIG. 3 is a flowchart of a method, performed by a terminal, of processing an image, according to an example embodiment.

In operation S310, the terminal may receive metadata including a plurality of circular images generated as a result of photographing a target space through at least one fisheye lens and lens shading compensation information of the plurality of circular images.

For example, the terminal may receive the plurality of circular images and the metadata that are encapsulated into one file. According to another example, the terminal may receive the plurality of circular images and the metadata separately. For example, the terminal may receive a media presentation description (MPD) including the lens shading compensation information.

In operation S320, the terminal may correct color information of each of the plurality of circular images based on the lens shading compensation information obtained from the metadata.

The terminal may determine a lens shading compensation value for correcting the color information of specific regions of each of the plurality of circular images from the lens shading compensation information. The lens shading compensation information according to an example embodiment may include information about correspondence between a specific area in the circular image and a lens shading compensation value applied to the specific region.

For example, the lens shading compensation information may be a coefficient of a polynomial function indicating the correspondence between the specific region and the lens shading compensation value of the specific region. Here, the region in the circular image may be specified through a distance from a center of the circular image and/or a viewing angle. In addition, the lens shading compensation value may indicate a gain for a RGB value in a specific region of the circular image.

The terminal may obtain a lens shading compensation value for each region in the circular image based on the information about the correspondence. Also, the terminal may correct the color information of the circular image by applying the obtained lens shading compensation value to the color information of the corresponding area.

In operation S330, the terminal may render the plurality of corrected circular images to generate a VR image for the target space.

The terminal may generate the VR image for the target space by rendering the plurality of circular images through processes such as degamma correction, gamma correction, stitching, projection, and mapping.

In operation S340, the terminal may output the generated VR image.

The terminal may output the generated VR image to a display of the terminal. In addition, according to another example embodiment, a terminal 200 may detect an eye gaze of a user (e.g., by tracking the user's eye movement) and output at least a partial region of the VR image corresponding to the detected eye gaze of the user. Meanwhile, the terminal may be coupled with a head-mounted display (HMD) device or the like to output the VR image generated through the HMD device.

Figure 4:
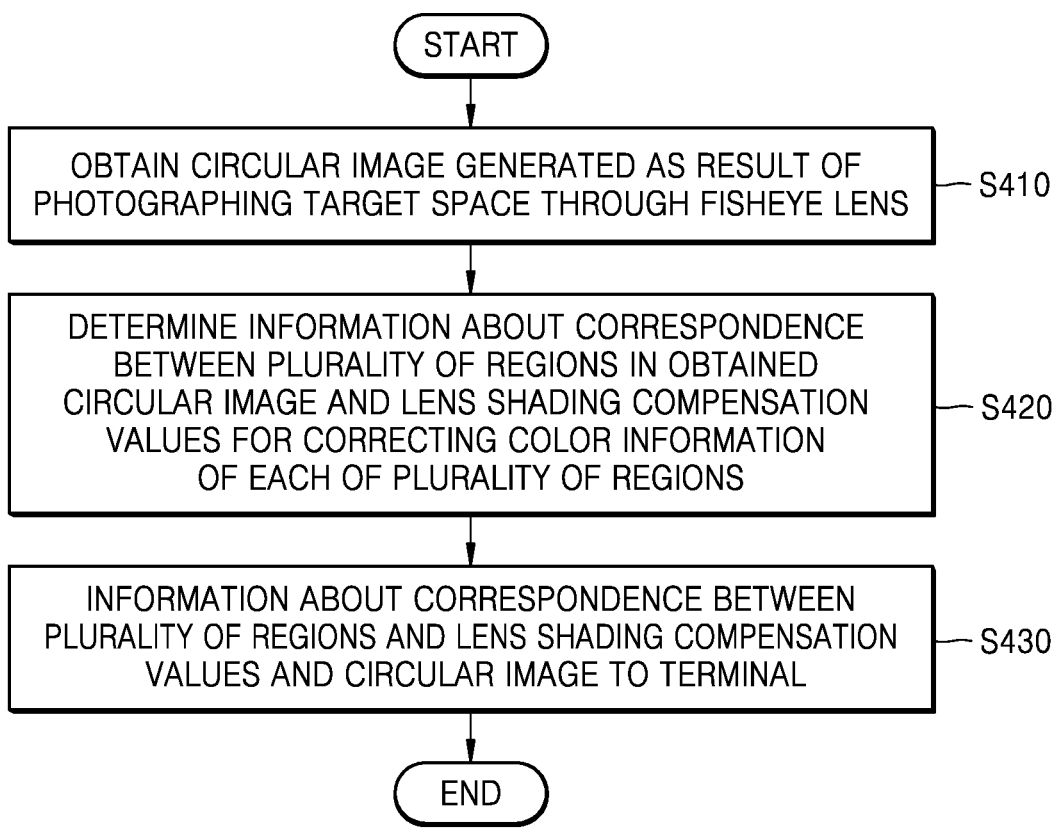
FIG. 4 is a flowchart of a method, performed by a device, of providing lens shading compensation information to a terminal, according to an example embodiment.

FIG. 4 is a flowchart of a method, performed by a device, of providing lens shading compensation information to a terminal, according to an example embodiment.

In operation S410, the device may obtain a circular image generated as a result of photographing a target space through a fisheye lens.

On the other hand, operation S410 may correspond to operation S210 described above with reference to FIG. 2.

In operation S420, the device may determine information about a correspondence between a plurality of regions in the obtained circular image and lens shading compensation values for correcting color information of each of the plurality of regions.

Here, the correspondence may be represented by a polynomial function having an input variable as a parameter capable of specifying a region in the circular image. For example, the input variable may include a distance between a specific region and a center of the fish-eye region or a viewing angle of the specific region, but this is only an example, and the input variable is not limited to the above example.

On the other hand, the information about the correspondence may include information about coefficients and orders for the polynomial function, and the like. Further, since the severity of lens shading may differ depending on the constituent colors of the circular image, the information about the correspondence may include information about the coefficient and the orders of the polynomial function for each color.

In operation S430, the device may transmit metadata including the information about the correspondence between the plurality of regions and the lens shading compensation values and the circular image to the terminal.

On the other hand, operation S430 may correspond to operation S230 described above with reference to FIG. 2.

Figure 5:
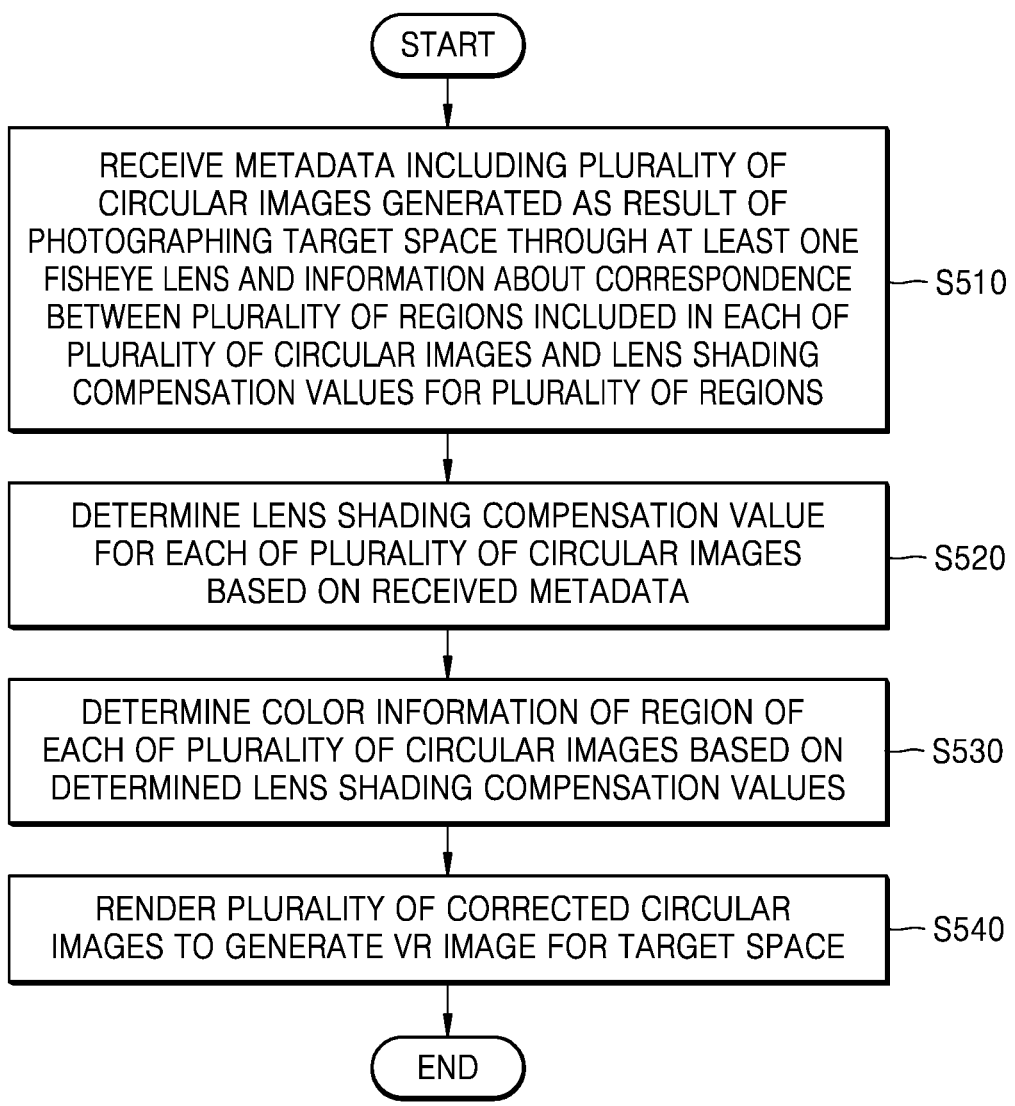
FIG. 5 is a flowchart of a method, performed by a terminal, of obtaining lens shading compensation information from a device, according to an example embodiment.

FIG. 5 is a flowchart of a method, performed by a terminal, of obtaining lens shading compensation information from a device, according to an example embodiment.

In operation S510, the terminal may receive metadata including a plurality of circular images generated as a result of photographing a target space through at least one fisheye lens and information about correspondence between a plurality of regions included in each of the plurality of circular images and lens shading compensation values for the plurality of regions.

Here, the correspondence may be represented by a polynomial function having a parameter specifying a region in a circular image as an input variable. For example, the input variable may be a distance between a specific region and a center of the circular image or a viewing angle of the specific region, but this is only an example, and the input variable is not limited to the example described above.

On the other hand, the information about the correspondence according to an example embodiment may include information about coefficients and orders for the polynomial function, and the like. For example, if a value of an element num_polynomial_coefficient is 2 and a value of an element polynomial_coefficient is 1, 4, or 5 in the information about the correspondence, the correspondence may be determined as $1+4x+5x^2$. Here, the distance between the specific region and the center of the circular image or the viewing angle of the specific region may be applied to the input variable x.

Further, since the severity of lens shading may differ depending on a color constituting the circular image, the information about the correspondence may include information about a coefficient and an order of the polynomial function for each color.

In operation S520, the terminal may determine a lens shading compensation value for each of the plurality of circular images based on the received metadata.

The terminal may obtain information about correspondence between the plurality of regions included in each of the plurality of circular images and the lens shading compensation values for the plurality of regions from the received metadata. For example, the terminal may determine the correspondence as $1+4x+5x^2$ as described above with reference to operation S510.

Accordingly, the terminal may apply the distance between the specific region and the center of the circular image or the viewing angle of the specific region as the input variable x to the correspondence polynomial function. Accordingly, the lens shading compensation value corresponding to the applied input variable may be determined as an output value of the polynomial function.

In operation S530, the terminal may determine color information of each region of the plurality of circular images based on the determined lens shading compensation values. For example, the terminal may correct the color information by applying the lens shading compensation value determined for each region to the color information of the corresponding region.

In operation S540, the terminal may render the plurality of corrected circular images to generate a VR image for the target space.

Operation S540 may correspond to operation S330 described above with reference to FIG. 3.

FIG. 6 illustrates a lens shading compensation information 600, according to an example embodiment.

Referring to FIG. 6, the lens shading compensation information 600 may include information about a correspondence between a plurality of regions in a circular image and lens shading compensation values for the plurality of regions. Here, the information about the correspondence may include information about coefficients and orders for a polynomial function.

For example, an attribute num_polynomial_coefficients_ls which is a first element 610 in the lens shading compensation information 600 may represent the order of the polynomial function. An attribute polynomial_coefficient_K_lsc_R which is a second element 620 may represent the coefficient of the polynomial function for correcting color information of an R (Red) component. An attribute polynomial_coefficient_K_lsc_G which is a third element 630 may represent the coefficient of the polynomial function for correcting color information of a G (Green) component. In addition, an attribute polynomial_coefficient_K_lsc_B which is a fourth element 640 may represent the coefficient of the polynomial function for correcting color information of a B (Blue) component.

Figure 7:
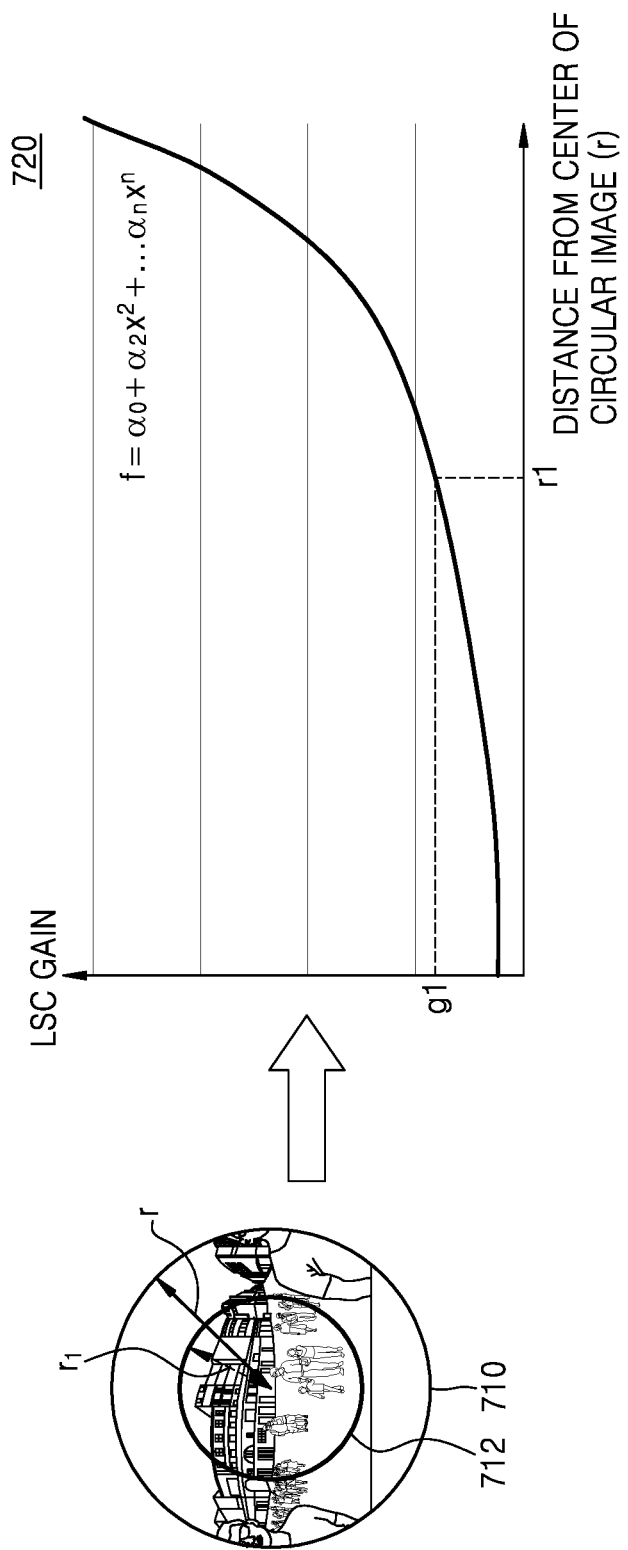
FIG. 7 is a diagram for describing a method, performed by a terminal, of extracting a lens shading compensation information value according to a distance from a center of a circular image, according to an example embodiment.

FIG. 7 is a diagram for describing a method, performed by a terminal, of extracting a lens shading compensation information value according to a distance r from a center of a circular image 710 according to an example embodiment.

Referring to FIG. 7, a region within the circular image 710 received by the terminal may be specified in terms of a distance from the center of the fish-ye 710 to the corresponding region. For example, the terminal may specify a region 712 at a distance r1 from the center of the circular image 710.

Meanwhile, FIG. 7 shows a graph 720 showing a lens shading compensation (LSC) gain according to the distance from the center of the circular image 710. It is assumed that the graph 720 of FIG. 7 may be represented as a polynomial function of $f=\alpha_0+\alpha_2 x^2+ \ldots +\alpha_n x^n$. Here, x denotes the distance from the center of the circular image 710 to the region within the circular image 710, and f denotes the LSC gain. Also, the terminal may receive degree information and coefficient information of the polynomial function from a device as lens shading compensation information.

Figure 8:
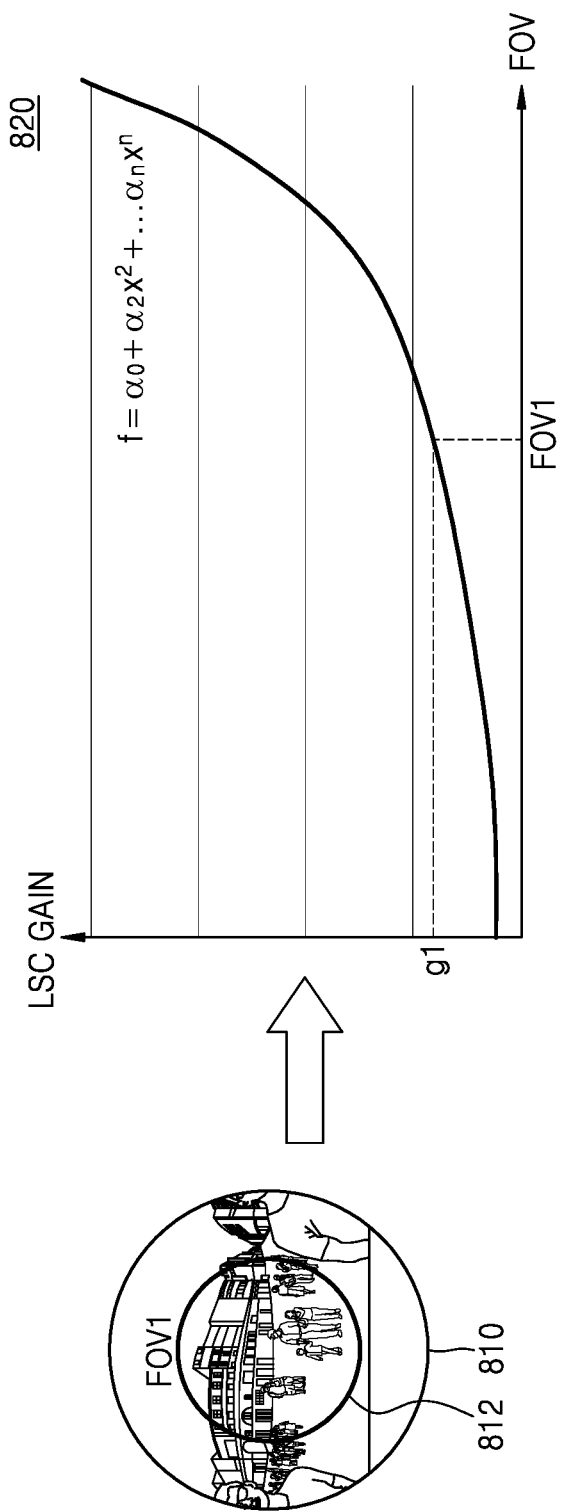
FIG. 8 is a diagram for describing a method, performed by a terminal, of extracting a lens shading compensation information value according to a field of view (FOV), according to an example embodiment.

FIG. 8 is a diagram for describing a method, performed by a terminal, of extracting a lens shading compensation information value according to a field of view (FOV) according to an example embodiment.

Referring to FIG. 8, a region within a circular image 810 received by the terminal may be specified according to the FOV. For example, the terminal may specify a region 812 having a FOV1 within the circular image 810.

Meanwhile, FIG. 8 shows a graph 820 indicating a lens shading compensation (LSC) gain according to the FOV of the circular image 810. It is assumed that the graph 820 of FIG. 8 may be represented as a polynomial function of $f=\alpha_0+\alpha_2 x^2+\ldots+\alpha_n x^n$. Here, x denotes the FOV (e.g., size of the FOV), and f denotes a lens shading compensation value. Also, the terminal may receive degree information and coefficient information of the polynomial function from a device as lens shading compensation information.

Figure 9:
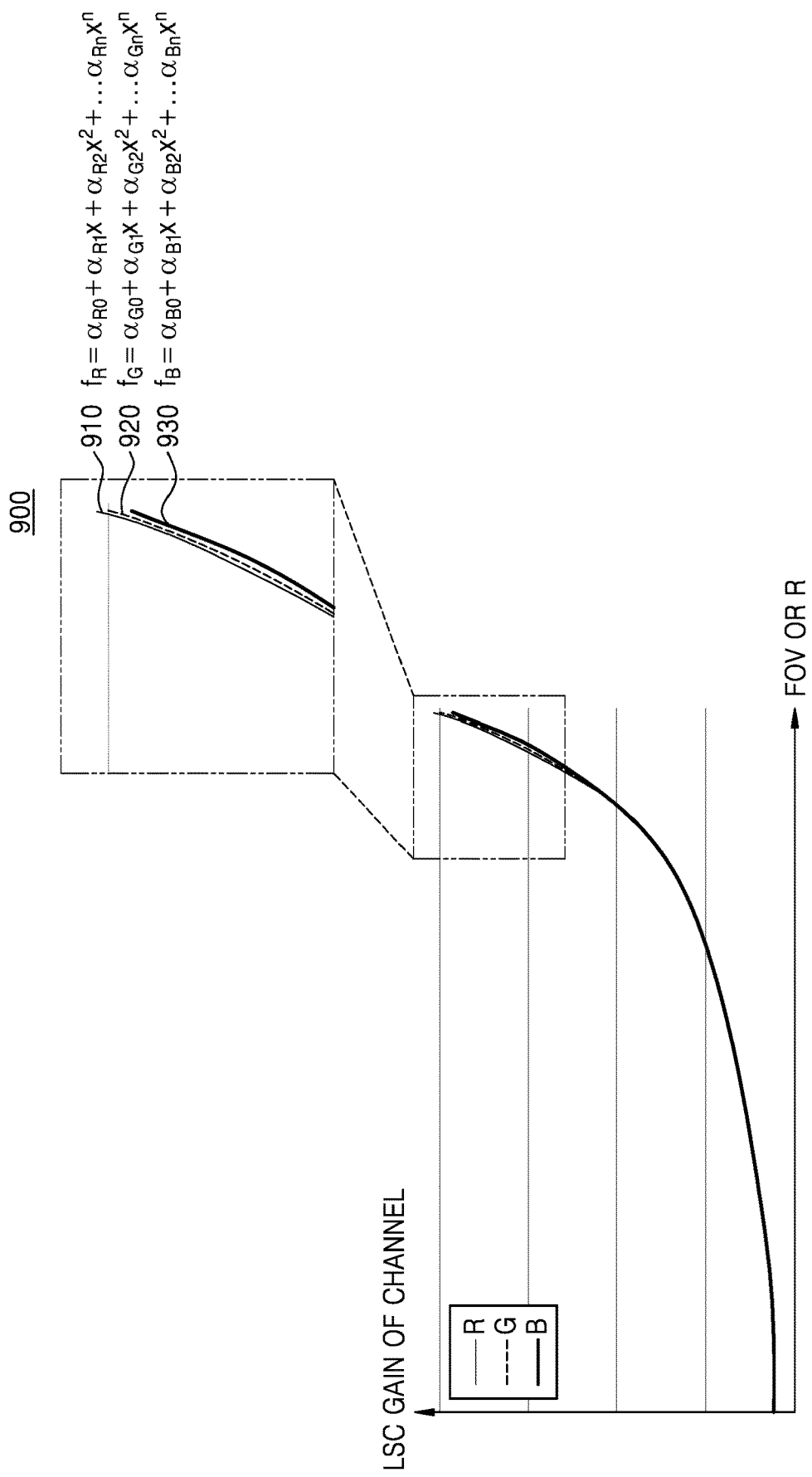
FIG. 9 is a graph for describing lens shading compensation information values according to color information, according to an example embodiment.

FIG. 9 is a graph 900 for describing lens shading compensation information values by color information according to an example embodiment.

Referring to FIG. 9, the lens shading compensation values may be different depending on colors. For example, the shorter the wavelength of the color, the greater the difference in the lens shading compensation values may be relative to the difference in a FOV or the distance r from a center of a circular image. For example, in the case of an R channel 910, a difference of the lens shading compensation value according to the FOV or the distance r from the center of the circular image may be greater compared to a G channel 920 or a B channel 930.

The graph also shows that the difference in the lens shading compensation value between the R channel 910, the G channel 920, and the B channel 930 increases as the FOV or the distance r from the center of the circular image increases.

Accordingly, a device according to an example embodiment may determine a polynomial function representing a correspondence between a plurality of regions in the circular image and lens shading compensation values for the plurality of regions, for each color channel. For example, the device may represent correspondence for the R channel 910 as a polynomial function of $f_R = \alpha_{R0} + \alpha_{R1} x + \alpha_{R2} x^2 \ldots + \alpha_{Rn} x^n$. Further, the device may represent correspondence for the G channel 920 as a polynomial function of $f_G = \alpha_{G0} + \alpha_{G1} x + \alpha_{G2} x^2 \ldots \alpha_{Gn} x^n$. Further, the device may represent a correspondence for the B channel 930 as a polynomial function of $f_B = \alpha_{B0} + \alpha_{B1} x + \alpha_{B2} x^2 \ldots + \alpha_{Bn} x^n$.

On the other hand, the device may provide the terminal with lens shading compensation information including the circular image and an order and a coefficient of the determined polynomial function for each channel. The terminal may determine the described correspondence based on order and coefficient information for each channel included in the lens shading compensation information received from the device. In addition, the terminal may determine the lens shading compensation value for each region in the circular image according to the determined correspondence.

Figure 10:
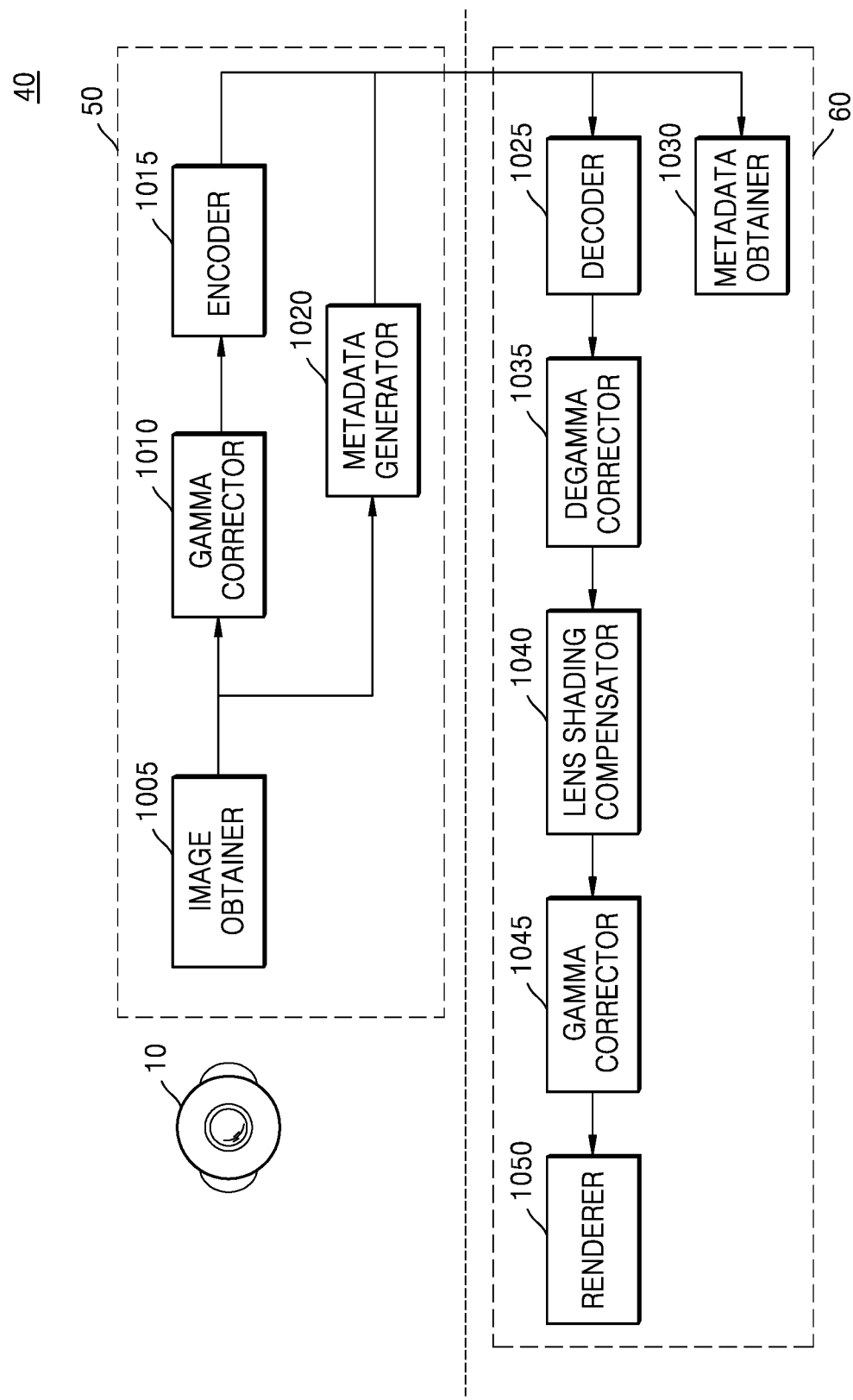
FIG. 10 is a conceptual diagram for describing a system for processing an image, according to another example embodiment.

FIG. 10 is a conceptual diagram for describing a system 40 for processing an image according to another example embodiment.

The system 40 for processing the image according to an example embodiment may include a device 50 and a terminal 60. The device 50 may include an image obtainer 1005, a gamma corrector 1010, an encoder 1015, and a metadata generator 1020. The terminal 60 may include a decoder 1025, a metadata obtainer 1030, a degamma corrector 1035, a lens shading compensator 1040, a gamma corrector 1045, and a renderer 1050.

However, this is only an example embodiment, and components of the system 40 for processing the image, the device 50, and the terminal 60 are not limited to the above-described examples. Meanwhile, the above-described components may be implemented by a software module (e.g., a program module including an instruction), a hardware module (e.g., circuits), or a combination of both. At least one processor may perform a series of operations to be described later according to the instruction of the software module.

The image obtainer 1005 may obtain a circular image. Here, the image obtainer 1005 may correspond to the image obtainer 110 described above with reference to FIG. 1.

The gamma corrector 1010 may perform gamma correction on the circular image. Gamma correction refers to a process of encoding information in accordance with non-linearity of human vision. Human vision responds nonlinearly to brightness according to the Weber's law. Because of this, linear recording of brightness of light may cause posterization. Accordingly, the gamma corrector 1010 may perform gamma correction to encode the information in accordance with the non-linearity of the human vision, in order to prevent image deterioration.

The encoder 1015 according to an example embodiment may encode the gamma corrected circular image.

The metadata generator 1020 according to an example embodiment may generate metadata including lens shading compensation information of the circular image. Further, according to another example, the metadata generator 1020 may generate metadata including the lens shading compensation information and gamma curve-related parameters.

Meanwhile, the encoded circular image and the metadata may be transmitted from the device 50 to the terminal 60.

The decoder 1025 according to an example embodiment may decode the encoded circular image.

The metadata obtainer 1030 may obtain information necessary for operations such as correction and rendering of the circular image from the metadata of the circular image. For example, the metadata obtainer 1030 may obtain lens shading compensation information of the circular image. According to another example, the metadata obtainer 1030 may obtain parameters related to a gamma curve.

The degamma corrector 1035 according to an example embodiment may perform degamma correction on the decoded circular image. The degamma corrector 1035 may change a relationship of an output signal with respect to an input signal of the decoded circular image from nonlinearity to linearity through a degamma correction process.

On the other hand, a method of obtaining a parameter related to the degamma curve used for degamma correction will be described later in detail with reference to FIGS. 12 and 13.

The lens shading compensator 1040 according to an example embodiment may perform lens shading compensation on the degamma corrected circular image.

The gamma corrector 1045 according to an example embodiment may perform gamma correction on the circular image on which lens shading compensation is performed.

Meanwhile, a method of obtaining a parameter related to the gamma curve used for gamma correction will be described later in detail with reference to FIGS. 12 and 13.

The renderer 1050 may perform rendering based on the gamma corrected circular image.

Figure 11:
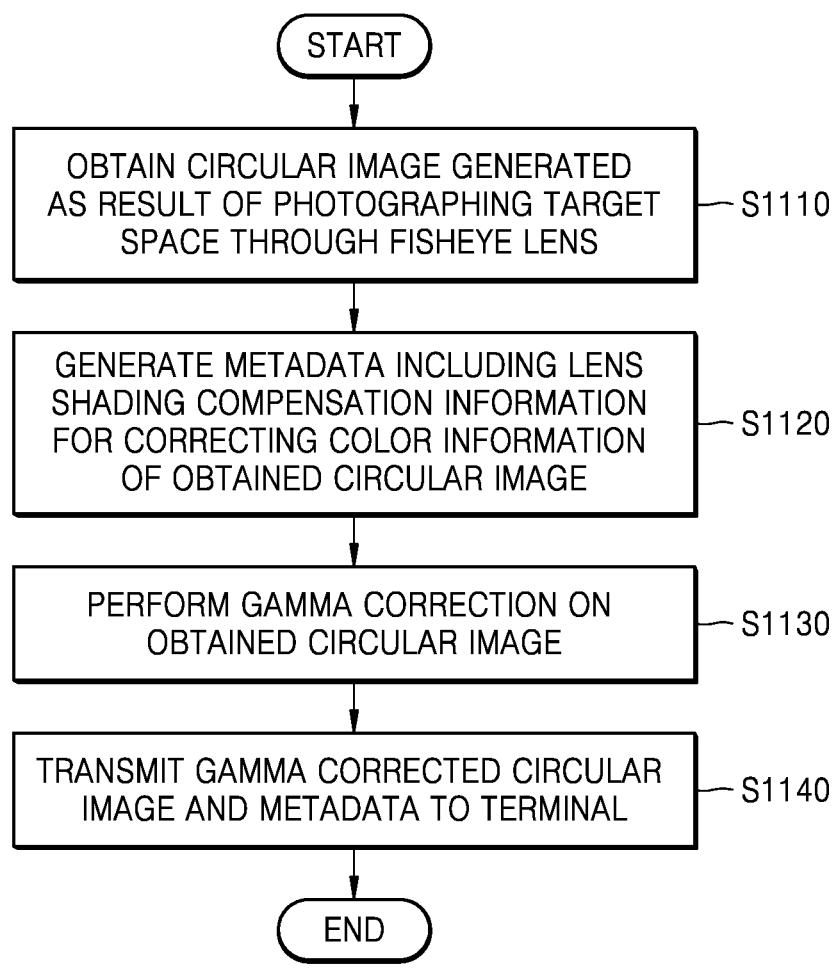
FIG. 11 is a flowchart of a method, performed by a device, of providing lens shading compensation information and a gamma corrected circular image to a terminal, according to an example embodiment.

FIG. 11 is a flowchart for describing a method, performed by a device, of providing lens shading compensation information and a gamma corrected circular image to a terminal according to an example embodiment.

In operation S1110, the device may obtain a circular image generated as a result of photographing a target space through a fisheye lens.

Meanwhile, operation S1110 may correspond to operation S210 described above with reference to FIG. 2.

In operation S1120, the device may generate metadata including lens shading compensation information for correcting color information of the obtained circular image.

On the other hand, operation S1120 may correspond to operation S220 described above with reference to FIG. 2.

In operation S1130, the device may perform gamma correction on the obtained circular image. Gamma correction refers to a process of encoding information in accordance with non-linearity of human vision. This will be described later in detail with reference to FIG. 13.

In operation S1140, the device may transmit the gamma corrected circular image and the metadata to the terminal. Here, in addition to the lens shading compensation information, the metadata may further include a gamma curve-related parameter indicating a characteristic of gamma correction performed in operation S1130.

Figure 12:
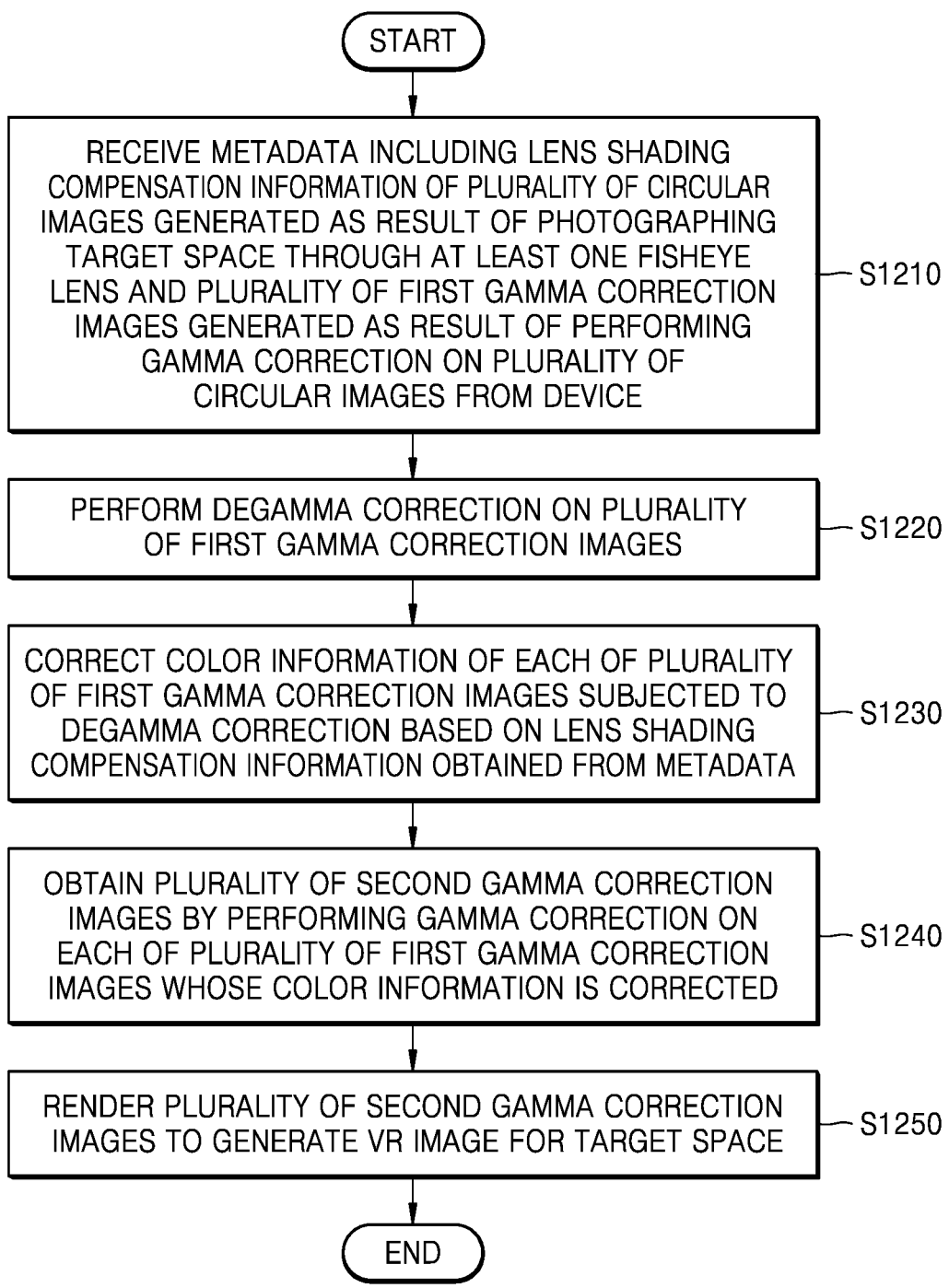
FIG. 12 is a flowchart of a method, performed by a terminal, of rendering a virtual reality (VR) image based on lens shading compensation information and a gamma corrected circular image, according to an example embodiment.

FIG. 12 is a flowchart for describing a method, performed by a terminal, of rendering a VR image based on lens shading compensation information and a gamma corrected circular image according to an example embodiment.

In operation S1210, the terminal may receive metadata including lens shading compensation information of a plurality of circular images generated as a result of photographing a target space through at least one fisheye lens and a plurality of first gamma correction images generated as a result of performing gamma correction on the plurality of circular images from a device.

In operation S1220, the terminal may perform degamma correction on the plurality of first gamma correction images.

The plurality of first gamma correction images received in the terminal may have non-linearity due to the gamma correction performed in the device. When the terminal applies lens shading compensation to the plurality of first gamma correction images, a correction effect due to lens shading compensation may be reduced due to non-linearity. Accordingly, the terminal may perform degamma correction on the plurality of first gamma correction images to correct the plurality of first gamma correction images to have linearity.

Meanwhile, the terminal according to an example embodiment may determine a degamma curve based on information about a gamma curve used for gamma correction from the device. For example, the metadata received from the device may include a parameter related to the gamma curve in addition to the lens shading information. In this case, the terminal may obtain the degamma curve by taking a reciprocal of the gamma curve applied in the device. For example, if the device performs gamma correction on the circular image by 0.45 times, the terminal may perform degamma correction by 2.22 (i.e., 1/0.45) on the plurality of first gamma correction images.

According to another example embodiment, the terminal may perform degamma correction on the plurality of first gamma correction images using the degamma curve previously stored in the terminal.

The terminal may analyze color information of the plurality of first gamma correction images to determine the gamma curve used for gamma correction in the device. The terminal may take the reciprocal on the determined gamma curve to obtain the degamma curve and perform degamma correction on the plurality of first gamma corrected images using the obtained degamma curve.

In operation S1230, the terminal may correct the color information of each of the plurality of first gamma correction images subjected to degamma correction based on the lens shading compensation information obtained from the metadata.

Operation S1230 may correspond to operation S320 described above with reference to FIG. 3.

In operation S1240, the terminal may obtain a plurality of second gamma correction images by performing gamma correction on each of the plurality of first gamma correction images whose color information is corrected.

The terminal may perform gamma correction on each of the plurality of first gamma correction images whose color information is corrected in order to encode each of the plurality of first gamma correction images whose color information is corrected according to human visual characteristics. Here, the gamma curve applied to gamma correction may be obtained by taking an inverse function to the degamma curve performed in operation S1220. According to another example, the gamma curve applied to gamma correction may be stored in the terminal.

In operation S1250, the terminal may render the plurality of second gamma correction images to generate the VR image for the target space.

Figure 13:
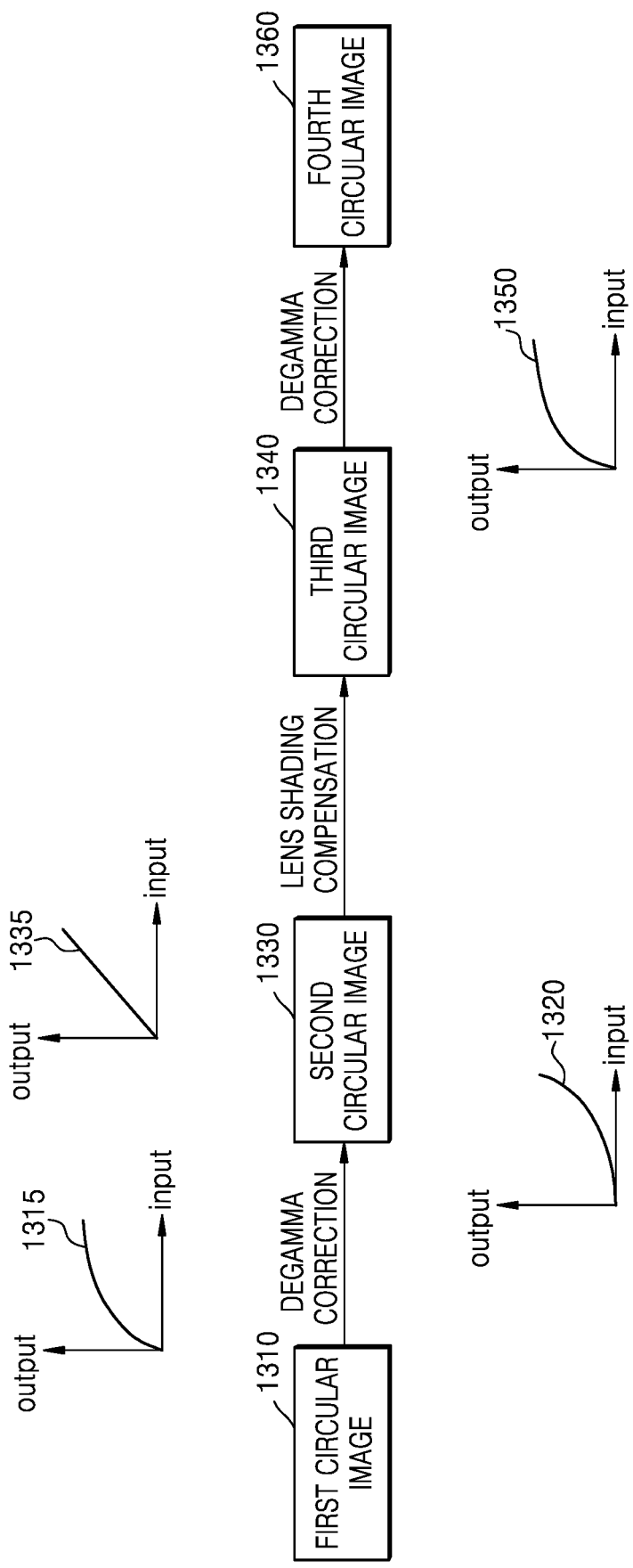
FIG. 13 is a diagram for describing a method, performed by a terminal, of rendering a VR image based on lens shading compensation information and a gamma corrected circular image, according to an example embodiment.

FIG. 13 is a diagram for describing a method, performed by a terminal, of rendering a VR image based on lens shading compensation information and a gamma corrected circular image according to an example embodiment.

Referring to FIG. 13, the terminal may receive a first circular image 1310 which is a gamma-corrected circular image from a device. In addition, the terminal may receive metadata including lens shading compensation information together with the first circular image 1310. A value of an output signal for an input signal of the first circular image 1310 may have a curve 1315 having non-linearity by gamma correction.

The terminal may perform degamma correction on the first circular image 1310 according to a degamma curve 1320 to correct the first circular image 1310 to a linear image before performing lens shading compensation on the first circular image 1310. Here, information about the degamma curve 1320 may be received from the device. According to another example, the information about the degamma curve 1320 may be obtained based on a result obtained from the terminal by analyzing color information of the first circular image 1310. Further, the information on the degamma curve 1320 may be stored in the terminal.

For convenience of explanation, the first circular image 1310 on which degamma correction is performed will be described as a second circular image 1330. By degamma correction, a value of an output signal for an input signal of the second circular image 1330 may have a form of a straight line 1335. The terminal may perform lens shading compensation on the second circular image 1330.

Also, the terminal may obtain a fourth circular image 1360 by performing gamma correction on a third circular image 1340 which is a circular image on which lens shading compensation is performed, according to the gamma curve 1350. Here, the gamma curve 1350 applied to gamma correction may be obtained by taking an inverse function of the degamma curve 1320. According to another example, the gamma curve 1350 applied to the gamma correction may be stored in the terminal.

Figure 14:
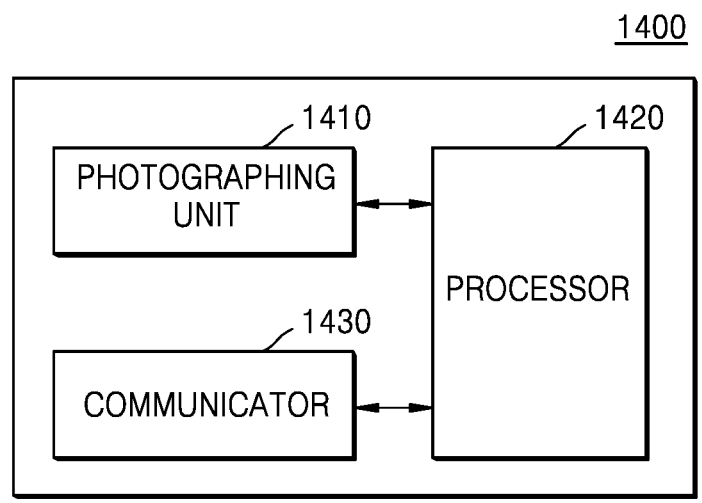
FIG. 14 is a block diagram of a device according to an example embodiment.

FIG. 14 is a block diagram of a device 1400, according to an embodiment.

As shown in FIG. 14, the device 1400 according to an example embodiment may include a photographing unit 1410, a processor 1420, and a communicator 1430. However, all the illustrated elements are not essential elements. The device 1400 may be implemented by a larger or smaller number of elements than the illustrated elements.

The photographing unit 1410 may obtain a circular image generated as a result of photographing a target space through a fisheye lens. However, this is merely an example. The photographing unit 1410, for example, may be a camera equipped with a fisheye lens. The device 1400 may receive a circular image photographed by an external device through the communicator 1430.

The processor 1420 may perform operations of a device described with reference to FIGS. 1 through 13.

A processor may be a central processing unit (CPU), a system on chip (SoC), an application-specific integrated circuit (ASIC), a graphics processing unit (GPU), etc. The processor 1420 may generate metadata including lens shading information for correcting color information of the circular image. However, this is merely an example. The metadata may further include a parameter relating to a gamma curve, etc.

The processor 1420 may determine information about a correspondence between a plurality of regions in the obtained circular image and lens shading compensation values for correcting color information of each of the plurality of regions. Also, the processor 1420 may perform gamma correction on the fisheye.

The communicator 1430 may transmit and receive data between the device 1400 and another device. For example, the communicator 1430 may transmit the circular image and metadata to a terminal. According to another example, the communicator 1430 may receive a circular image photographed by an external device. A communicator may be a network adapter, a communication module, etc.

Figure 15:
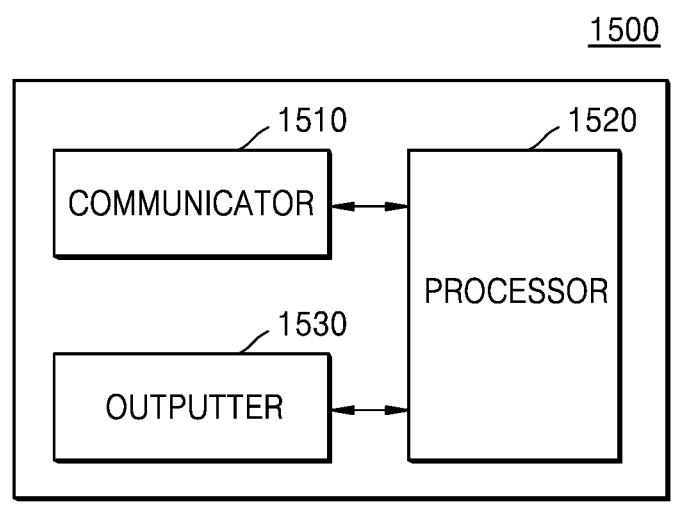
FIGS. 15 and 16 are block diagrams of a terminal according to an example embodiment.
Figure 16:
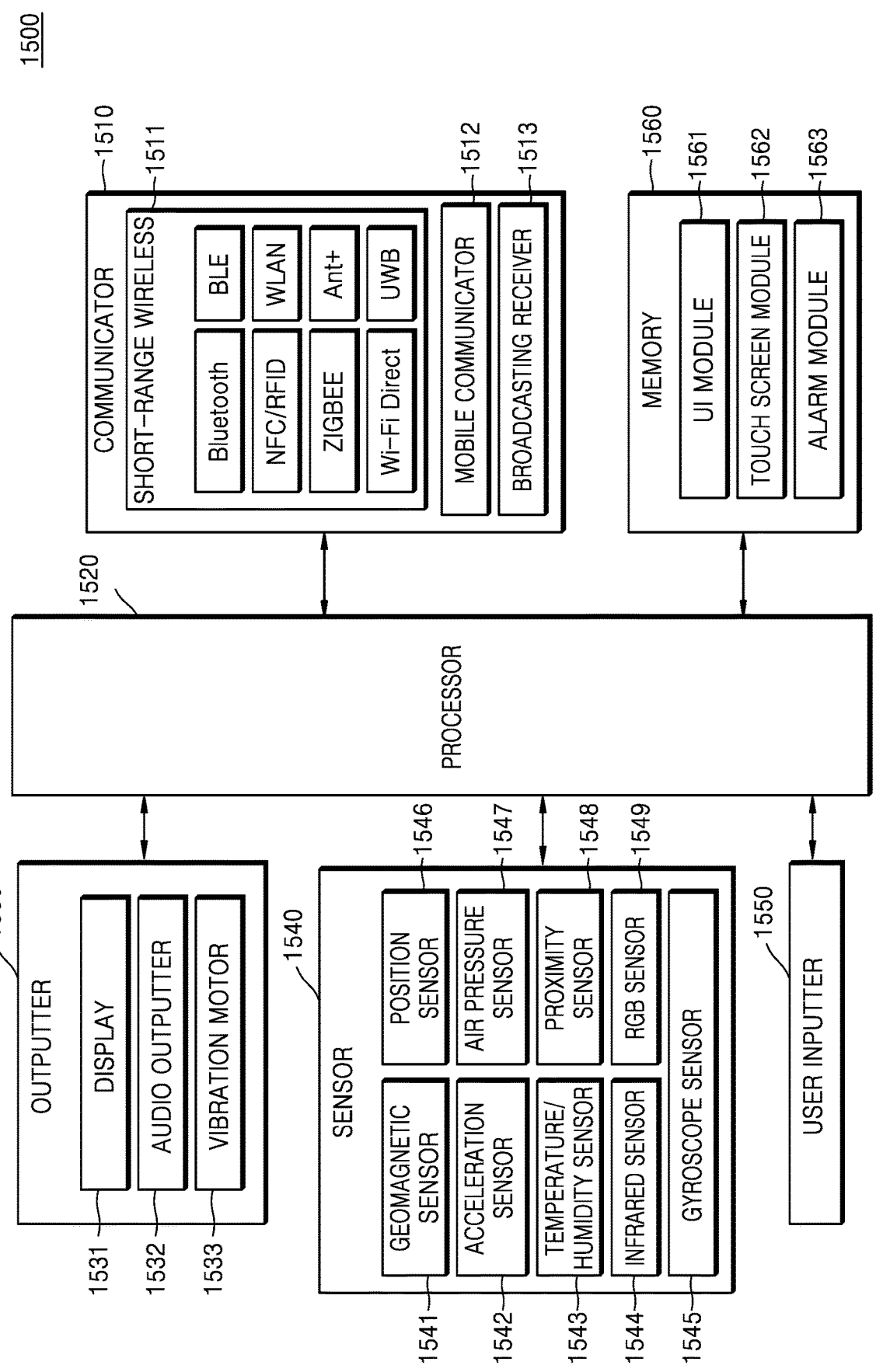

FIGS. 15 and 16 are block diagrams of a terminal 1500 according to an example embodiment.

As shown in FIG. 15, the terminal 1500 may include a communicator 1510, a processor 1520, and an outputter 1530. However, all the illustrated elements are not essential elements. The terminal 1500 may be implemented by a larger or smaller number of elements than the illustrated elements.

For example, as shown in FIG. 16, the terminal 1500 according to an example embodiment may include a sensor 1540, a user inputter 1550, and a memory 1560 as well as the communicator 1510, the processor 1520, and the outputter 1530.

Hereinbelow, the foregoing elements will be described in detail.

The communicator 1510 may obtain a circular image and metadata of the circular image from the device 1400.

Also, when the terminal 1500 is coupled with an external device such as an HMD device, the communicator 1510 may transmit a VR image generated by the processor 1520 to the external device in order to output the VR image through the external device.

Meanwhile, the communicator 1510 may include one or more elements that enable communication between the terminal 1500 and an external device (e.g., the device 1500 of FIG. 14). For example, the communicator 1510 may include a short-range wireless communicator 1511, a mobile communicator 1512, and a broadcasting receiver 1513.

The short-range wireless communicator 1511 may include, but not limited to, a Bluetooth Low Energy (BLE) communicator, a near-field communication (NFC) unit, a wireless local area network (WLAN) (WiFi) communicator, a ZigBee communicator, an infrared Data Association (IrDA) communicator, a WiFi Direct (WFD) communicator, an ultra-wideband (UWB) communicator, and an Ant+ communicator.

The mobile communicator 1512 may transmit and receive a radio signal to and from at least one of a base station, an external terminal, and a server over a mobile communication network.

The broadcasting receiver 1513 (e.g., a broadcast tuner) may receive a broadcast signal and/or broadcasting-related information from an external source through a broadcasting channel. According to implementation examples, the terminal 1500 may not include the broadcasting receiver 1513.

The processor 1520 may control an overall operation of the terminal 1500. For example, the processor 1520 may control generally the communicator 1510, the outputter 1530, the sensor 1540, the user inputter 1550, and the memory 1560 by executing programs stored in the memory 1560.

The processor 1520 may correct color information of each of the plurality of circular images based on the lens shading compensation information obtained from the metadata. The processor 1520 may render the corrected plurality of circular images to generate a VR image for a target space.

In addition, the processor 1520 may determine lens shading compensation values for a plurality of regions, based on a parameter indicating a correspondence between the plurality of regions in the circular image identified according to a distance from a center of the circular image and the lens shading compensation values for the plurality of regions, included in the lens shading compensation information. The processor 1520 may correct color information of the plurality of areas based on the determined lens shading compensation values for the plurality of regions.

The processor 1520 may determine lens shading compensation values for a plurality of regions, based on a parameter indicating correspondence between the plurality of regions in the circular image identified according to a FOV of the circular image and the lens shading compensation values for the plurality of regions, included in the lens shading compensation information. The processor 1520 may also correct color information of the plurality of areas based on the determined lens shading compensation values for the plurality of regions.

In addition, the processor 1520 may determine lens shading compensation values for a plurality of regions, based on a parameter indicating correspondence between the plurality of regions in the circular image and the lens shading compensation values for the plurality of regions, included in the lens shading compensation information. The processor 1520 may correct color information of the plurality of areas based on the determined lens shading compensation values for the plurality of regions.

The processor 1520 may perform degamma correction on a plurality of first gamma corrected images. Further, the processor 1520 may correct color information of each of the plurality of degamma-corrected images based on the lens shading compensation information obtained from the metadata. In addition, the processor 1520 may perform gamma correction on each of the plurality of color-corrected images to obtain a plurality of second gamma correction images. In addition, the processor 1520 may render the plurality of second gamma correction images to generate a VR image.

Meanwhile, the processor 1520 may analyze the color information of the plurality of first gamma correction images to obtain a parameter related to a gamma curve applied upon gamma correction of the device.

The outputter 1530 may output an audio signal, an image signal, or a vibration signal, and may include a display 1531, an audio outputter 1532, a vibration motor 1533, and the like.

The display 1531 may display information processed by the terminal 1500. For example, the display 1531 may output the VR image generated as a result of rendering in the processor 1520. The display 1531 may output at least a region of the VR image, which corresponds to a user's gaze sensed by the sensor 1540.

The audio outputter 1532 may output audio data received from the communicator 1510 or stored in the memory 1560.

The vibration motor 1533 may generate vibration, for example, to provide haptic sensation.

The sensor 1540 may sense at least one of a state of the terminal 1500, a surrounding state of the terminal 1500, and a state of a user wearing the terminal 1500, and deliver sensed information to the processor 1520. For example, the sensor 1540 may sense the eye gaze of the user who is wearing the terminal 1500 or movement of a head of the user.

The sensor 1540 may include, but not limited to, at least one of a magnetic sensor 1541, an acceleration sensor 1542, a temperature/humidity sensor 1543, an infrared sensor 1544, a gyroscope sensor 1545, a positioning sensor (e.g., a global positioning system (GPS)) 1546, a pressure sensor 1547 (e.g., an air pressure sensor), a proximity sensor 1548, and a red/green/blue (RGB) sensor (or an illuminance sensor) 1549. A function of each sensor may be intuitively construed from a name of each sensor by those of ordinary skill in the art, and thus will not be described in detail.

The user inputter 1550 is a means for inputting data for controlling the terminal 1500. For example, the user inputter 1550 may receive a user input requesting the VR image of the target space. The user inputter 1550 may receive a user input for selecting at least one of objects of the target space. However, this is merely an example, and a type of the user input received by the user inputter 1550 is not limited to the above-described example. For example, the user input may be received via one or more of the sensors 1540. The user inputter 1550 may also include a keyboard, a mouse, a stylus, haptic gloves, a microphone, and/or a camera.

The memory 1560 may store programs for processing and control by the processor 1520 and store input/output data (one or more images, metadata regarding the one or more images, and a VR image generated as a result of rendering, received from the device 1500).

The programs stored in the memory 1560 may be classified into a plurality of modules depending on a function thereof, e.g., a user interface (UI) module 1561, a touch screen module 1562, a notification module 1563, and the like.

The UI module 1561 may provide a specialized UI or graphical UI (GUI) interworking with the terminal 1500 for each application. The touch screen module 1562 may sense a touch gesture of a user on a touch screen and deliver information about the touch gesture to the processor 1520. The notification module 1563 may output a signal for notifying of an occurrence of an event of the terminal 1500. Examples of the event occurring in the terminal 1500 may include key signal input, and the like. The notification module 1563 may output a notification signal in the form of a image signal through the display 1531, in the form of an audio signal through the audio outputter 1532, and/or in the form of a vibration signal through the vibration motor 1533.

The methods according to the example embodiments may be implemented in the form of program commands that may be executed through various computer components and recorded in a non-transitory computer-readable recording medium. The non-transitory computer-readable recording medium may include a program command, a data file, a data structure and the like solely or in a combined manner. The program command recorded in the non-transitory computer-readable recording medium may be a program command specially designed and configured for the present example embodiments or a program command known to be used by those skilled in the art of the computer software field. Examples of the non-transitory computer-readable recording medium may include magnetic media such as hard disk, floppy disk, and magnetic tape, optical media such as compact disk read only memory (CD-ROM) and digital versatile disk (DVD), magneto-optical media such as floptical disk, and a hardware device especially configured to store and execute a program command, such as read-only memory (ROM), random access memory (RAM) and flash memory, etc. Further, examples of the program instructions include a machine language code created by a complier and a high-level language code executable by a computer using an interpreter.

The present disclosure contains example embodiments that are designed to solve the technical problem that are involved with obtaining and manipulating digital images, such as circular images obtained via a fisheye lens, by providing a method and apparatus for compensating for lens shading by means of hardware and/or software. Thereby, an improved computing, photographing, and/or virtual reality system may be achieved. While the present disclosure has been shown and described with reference to certain example embodiments thereof, the scope of the present disclosure is not limited to the description and also includes various modifications and improvements made by those of ordinary skill in the art using the concept of the present disclosure defined in the appended claims.

What is claimed is:

1. A method of processing an image by an electronic device, the method comprising:
    obtaining a plurality of circular images via at least one fisheye lens;
    obtaining fisheye information including lens shading compensation information, wherein the lens shading compensation information includes coefficients of a polynomial function for each of RGB colors of the plurality of circular images and a number of the coefficients; and
    transmitting the obtained plurality of circular images and the lens shading compensation information toward another electronic device,
    wherein the polynomial function represents relation between lens shading compensation values for the plurality of circular images and a distance from a center of an image of the plurality of circular images,
    wherein the polynomial function is $w=\Sigma_{i=1}^{N}p_{i-1}\cdot r^{i-1}$, where w is a lens shading compensation value for one of the RGB colors, N is the number of the coefficients, $p_{i-1}$ is a coefficient and r is the distance from the center of the image, and
    wherein compensating the plurality of circular images is performed in the another electronic device by using the lens shading compensation values.

2. The method of claim 1, wherein the fisheye information is used for rendering a plurality of compensated circular images corresponding to the plurality of circular images in the another electronic device.

3. The method of claim 1, wherein the lens shading compensation values are used for correcting color information of each of a plurality of regions in the image in the another electronic device.

4. The method of claim 1, wherein the coefficients indicate a correspondence between a plurality of regions in the image, identified based on the distance from the center of the image.

5. A system comprising an electronic device of processing an image and another electronic device, the electronic device comprising:
    a communicator;
    a memory for storing instructions; and
    at least one processor configured to execute the stored instructions to at least:
    obtain a plurality of circular images, wherein the plurality of circular images are captured via at least one fisheye lens;
    obtain fisheye information including lens shading compensation information, wherein the lens shading compensation information includes coefficients of a polynomial function for each of RGB colors of the plurality of circular images and a number of the coefficients; and
    transmit, via the communicator, the obtained plurality of circular images and the lens shading compensation information toward the another electronic device,
    wherein the polynomial function represents relation between lens shading compensation values for the plurality of circular images and a distance from a center of an image of the plurality of circular images,
    wherein the polynomial function is $w=\Sigma_{i=1}^{N}p_{i-1}\cdot r^{i-1}$, where w is a lens shading compensation value for one of the RGB colors, N is the number of the coefficients, $p_{i-1}$ is a coefficient and r is the distance from the center of the image, and wherein the another electronic device performs compensating the plurality of circular images by using the lens shading compensation values.

6. The system of claim 5, wherein the fisheye information is used for rendering a plurality of compensated circular images corresponding to the plurality of circular images in the another electronic device.

7. The system of claim 5, wherein the lens shading compensation values are used for correcting color information of each of a plurality of regions in the image in the another electronic device.

8. The system of claim 5, wherein the coefficients indicate a correspondence between a plurality of regions in the image, identified based on the distance from the center of the image.

\* \* \* \* \*